US010837095B2

(12) United States Patent
Kai et al.

(10) Patent No.: US 10,837,095 B2
(45) Date of Patent: Nov. 17, 2020

(54) HOLLOW STABILIZER PRODUCTION METHOD AND HOLLOW STABILIZER PRODUCTION DEVICE

(71) Applicant: NHK SPRING CO., LTD., Yokohama-shi, Kanagawa (JP)

(72) Inventors: Morimichi Kai, Yokohama (JP); Akira Tange, Yokohama (JP)

(73) Assignee: NHK SPRING CO., LTD., Kanagawa (JP)

(*) Notice: Subject to any disclaimer, the term of this patent is extended or adjusted under 35 U.S.C. 154(b) by 33 days.

(21) Appl. No.: 16/145,137

(22) Filed: Sep. 27, 2018

(65) Prior Publication Data

US 2019/0032190 A1 Jan. 31, 2019

Related U.S. Application Data

(63) Continuation of application No. PCT/JP2017/005578, filed on Feb. 15, 2017.

(30) Foreign Application Priority Data

Mar. 30, 2016 (JP) .................................. 2016-068015

(51) Int. Cl.
*C23C 8/04* (2006.01)
*B60G 21/055* (2006.01)
(Continued)

(52) U.S. Cl.
CPC .............. *C23C 8/04* (2013.01); *B60G 21/055* (2013.01); *C21D 1/06* (2013.01); *C21D 9/08* (2013.01);
(Continued)

(58) Field of Classification Search
CPC ................................... C23C 8/04; C23C 8/22
See application file for complete search history.

(56) References Cited

U.S. PATENT DOCUMENTS 4,145,232 A * 3/1979 Solomon ................... C23C 8/22
148/218
4,208,040 A * 6/1980 Svetlov ..................... C23C 8/04
266/121

FOREIGN PATENT DOCUMENTS

JP 46006326 B1 2/1971
JP 55011169 A 1/1980
(Continued)

OTHER PUBLICATIONS

JP S59-129777 machine translation by Espacenet (Year: 2019).*
JP 2001-152315 machine translation by Espacenet (Year: 2020).*
International Search Report (ISR) dated Mar. 28, 2017 issued in International Application No. PCT/JP2017/005578.
Written Opinion dated Mar. 28, 2017 issued in International Application No. PCT/JP2017/005578.
(Continued)

*Primary Examiner* — Patricia L. Hailey
*Assistant Examiner* — Christopher Douglas Moody
(74) *Attorney, Agent, or Firm* — Holtz, Holtz & Volek PC

(57) ABSTRACT

A hollow stabilizer production method of a hollow stabilizer used for a vehicle includes attaching a first mounting member and a second mounting member respectively to one end and another end of a formed steel tube and heating the steel tube. The method includes feeding a carburizing gas into the interior space of the heated steel tube through the first mounting member, and collecting the air and/or the surplus carburizing gas from the interior space through the second mounting member to thereby carburize the steel tube inner surface. The method includes rapidly cooling the heated steel tube to thereby quench the steel tube continuously from the carburization.

5 Claims, 8 Drawing Sheets

(51) Int. Cl.
*C21D 9/08* (2006.01)
*C23C 8/22* (2006.01)
*C21D 1/06* (2006.01)
*C23C 28/00* (2006.01)
*C23C 28/04* (2006.01)
*C23C 8/02* (2006.01)
*C23C 8/80* (2006.01)

(52) U.S. Cl.
CPC ............ *C23C 8/02* (2013.01); *C23C 8/22* (2013.01); *C23C 8/80* (2013.01); *C23C 28/00* (2013.01); *C23C 28/04* (2013.01); *B60G 2202/134* (2013.01); *B60G 2206/012* (2013.01); *B60G 2206/427* (2013.01); *B60G 2206/724* (2013.01); *B60G 2206/8402* (2013.01)

(56) References Cited

FOREIGN PATENT DOCUMENTS

| | | |
|---|---|---|
| JP | S59129777 A | 7/1984 |
| JP | 61003878 A | 1/1986 |
| JP | H06100942 | 4/1994 |
| JP | 2000118224 A | 4/2000 |
| JP | 2001152315 A | 6/2001 |
| JP | 2010053431 A | 3/2010 |

OTHER PUBLICATIONS

Japanese Office Action (and English language translation thereof) dated Jun. 18, 2019 issued in counterpart Japanese Application No. 2018-508549.

\* cited by examiner

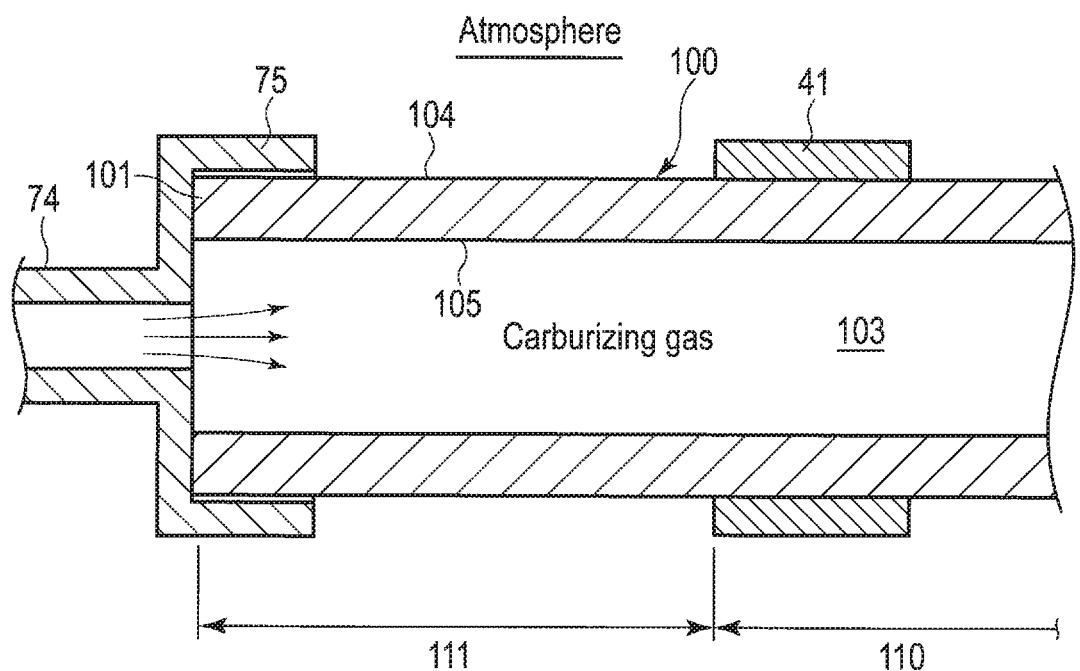
F I G. 3
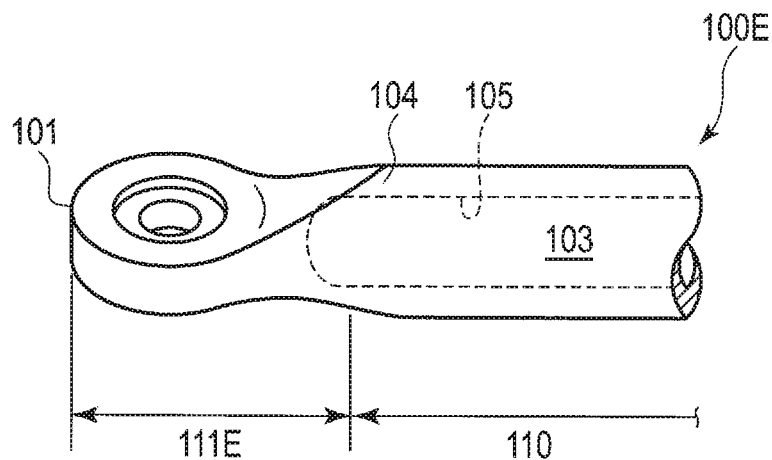
F I G. 4

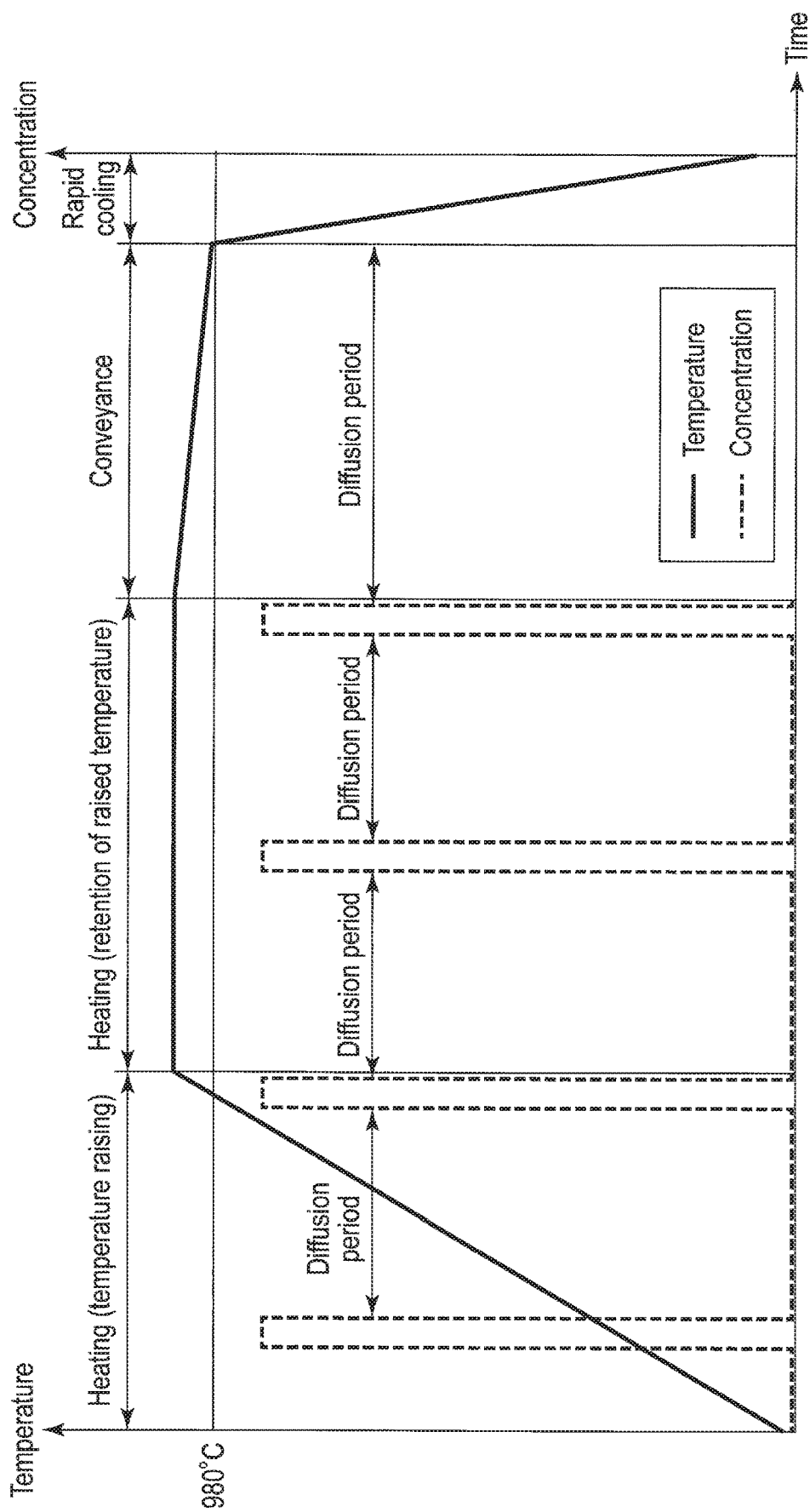
F I G. 9

HOLLOW STABILIZER PRODUCTION METHOD AND HOLLOW STABILIZER PRODUCTION DEVICE

CROSS-REFERENCE TO RELATED APPLICATIONS

This application is a Continuation Application of PCT Application No. PCT/JP2017/005578, filed Feb. 15, 2017 and based upon and claiming the benefit of priority from prior Japanese Patent Application No. 2016-068015, filed Mar. 30, 2016, the entire contents of all of which are incorporated herein by reference.

BACKGROUND OF THE INVENTION

1. Field of the Invention

The present invention relates to a hollow stabilizer production method of producing a hollow stabilizer for a vehicle and hollow stabilizer production device used for the production method.

2. Description of the Related Art

In order to restrain an inclination of a vehicle body at the time of turning and improve the riding comfort, a stabilizer is installed in a vehicle such as an automobile or the like. The stabilizer is, for example, a torsion bar bent into a U-shape. A hollow stabilizer the inside of which is made hollow in order to reduce the weight of a vehicle is also known. In order to improve the resistance to fatigue, it is desirable that a steel tube outer surface and steel tube inner surface be hardened.

As a method of hardening the surface, quenching is widely known. When quenching is carried out at an ideal cooling rate, the degree of hardness of steel is determined by a carbon concentration. However, the surface of the hollow stabilizer has already been somewhat decarburized at the stage of the original material tube which is a material. When the hollow stabilizer is subjected to a high temperature for quenching, the decarburization thereof is further advanced. Regarding the steel tube outer surface, residual compression stress can be created by a simple method such as shot peening or the like, and hence even when the carbon concentration is not perfect, there is no problem. On the other hand, regarding the steel tube inner surface, it is difficult to carry out treatment such as the shot peening or the like. In order to improve the resistance to fatigue, there is the demand for enhancement of the effect of quenching particularly on the steel tube inner surface of a hollow stabilizer.

In order to enhance the degree of hardness after quenching, it can be considered that the steel tube inner surface be carburized before quenching to adjust the carbon concentration (for example, Patent Literature 1 (JP 2000-118224 A)). However, when a liquid carburizing agent is attached to the steel tube inner surface by immersion or application, the amount of carbon to be carburized is excessive. There is sometimes a case where the carbon concentration is uneven at each position. Occurrence of excessively hardened positions is not desirable for the hollow spring of which toughness is required as a spring. Further, when the hollow stabilizer is put into the inside of a carburizing furnace filled with a carburizing gas, a dedicated carburization furnace and modification furnace (converter) are required, and hence the cost of equipment and administration cost become expensive. Energy consumed by heating the inside of the furnace increases. Putting the hollow stabilizer into the furnace is carried out in a batch-wise manner, and thus the time required to complete a hollow stabilizer in the production line is prolonged.

BRIEF SUMMARY OF THE INVENTION

Embodiments described herein aim to provide a production method and production device of a hollow stabilizer making it possible to consecutively carry out carburization and quenching of a hollow stabilizer, save the time necessary for carburization and energy consumed by carburization, and requiring no dedicated carburizing furnace for the purpose of carburization.

According to a hollow stabilizer production method of one embodiment, carburization and quenching of an inner surface of a hollow stabilizer used for a vehicle are carried out continuously. First, a first mounting member and a second mounting member are attached respectively to one end and another end of a formed steel tube and the steel tube is heated. Here, the steel tube may be heated after attaching the first mounting member and the second mounting member respectively to one end and another end, or the steel tube may be heated first and then the first mounting member and the second mounting member may be attached respectively to one end and another end. While heating the steel tube, a carburizing gas is fed into the interior space of the steel tube through the first mounting member, and also the air and/or the surplus carburizing gas is collected from the interior space through the second mounting member to thereby carburize the steel tube inner surface. Then, the heated steel tube is rapidly cooled to thereby quench the steel tube continuously from the carburization.

A hollow stabilizer production device according to another embodiment, comprises a first mounting member, a second mounting member, a gas supplying device, a gas exhaust device, a heating device, a cooling bath and a conveying device. The first mounting member is attached to one end of a formed steel tube. The second mounting member is attached to another end of the steel tube. The gas supplying device feeds a carburizing gas into the interior space of the steel tube through the first mounting member. The gas exhaust device collects the air and/or the surplus carburizing gas from the interior space through the second mounting member. The heating device heats the steel tube. The cooling bath rapidly cools the steel tube. The conveying device conveys the steel tube from the heating device to the cooling bath.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a cross-sectional view showing one end of a steel tube carburized by the carburizing method according to this embodiment.

FIG. 4 is a perspective view showing one end of a hollow stabilizer of a completed product.

FIG. 9 is a view showing an example of relationships between the temperature of a hollow stabilizer, carbon potential value of a carburizing gas and elapsed time in the carburization and quenching step according to a third embodiment.

DETAILED DESCRIPTION OF THE INVENTION

One of the embodiments of the present invention will be described hereinafter with reference to the accompanying drawings.

FIG. 1 through FIG. 9 show a hollow stabilizer production device according to the present embodiment.

Figure 1:
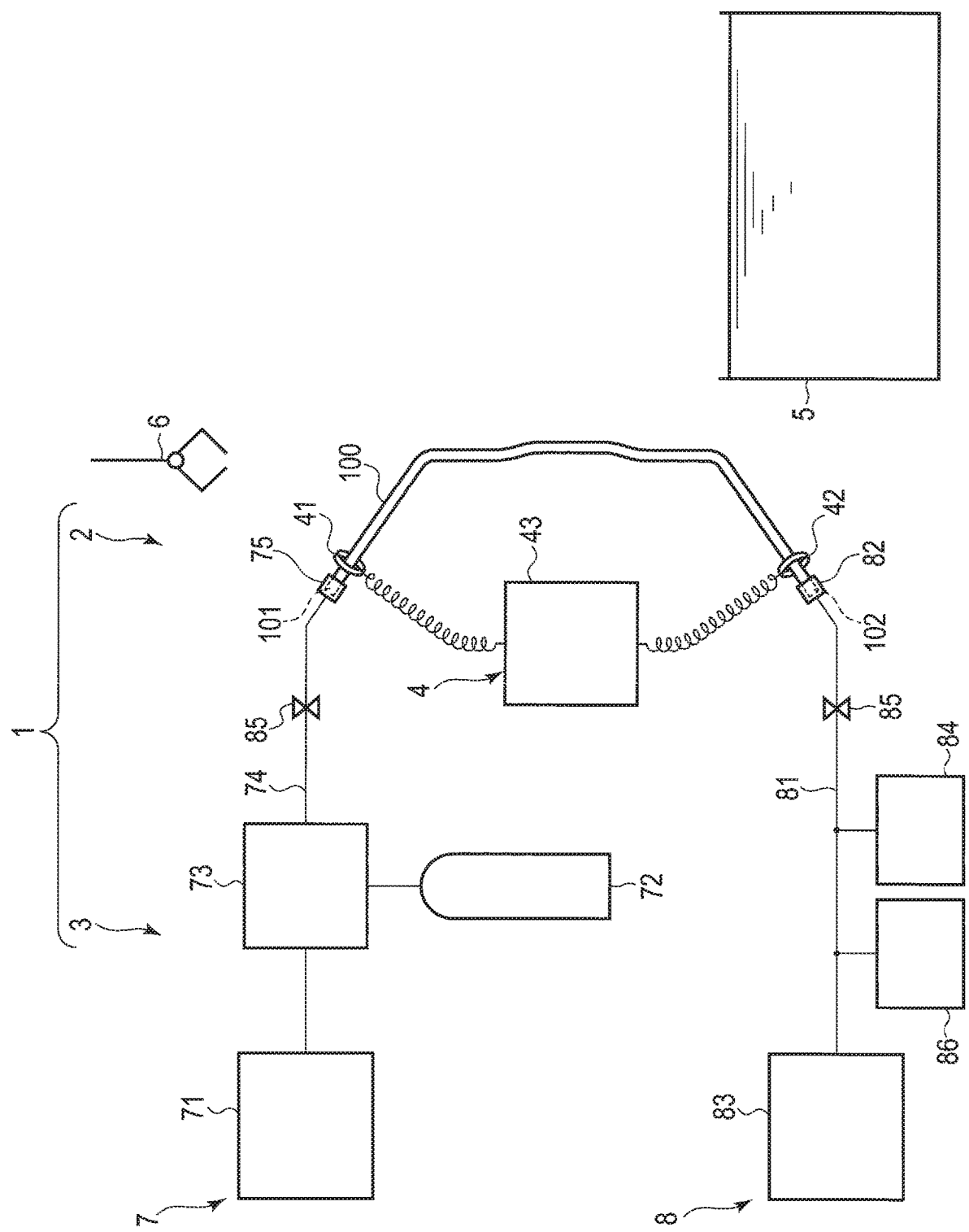
FIG. 1 is a view schematically showing the configuration of a hollow stabilizer production device of an embodiment.

FIG. 1 is a view schematically showing the configuration of a hollow stabilizer production device 1. As shown in FIG. 1, the hollow stabilizer production device 1 is provided with a quenching device 2 and carburization device 3. The quenching device 2 is provided with a heating device 4, cooling bath 5, and conveying device 6. The carburization device 3 is provided with a gas supplying device 7 and gas exhaust device 8.

The heating device 4 is provided with a first electrode 41, second electrode 42, and electric power source 43. The first electrode 41 and second electrode 42 are electrically connected to the electric power source 43, and hold a steel tube 100 to be fabricated into a hollow stabilizer 100E. The electric power source 43 makes an electric current flow between the first electrode 41 and second electrode 42 to thereby heat the steel tube 100 by electrification.

The cooling bath 5 is a container capable of accommodating therein the steel tube 100, and is filled with oil or water. The conveying device 6 is, for example, a transfer robot, and conveys the steel tube 100 heated at a high temperature from the heating device 4 to the cooling bath 5 while holding the steel tube 100.

The gas supplying device 7 is provided with, for example, a source gas supply source 71, carrier gas supply source 72, flow controller 73, lead-in pipe 74, and first mounting member 75.

The source gas supply source 71 supplies a source gas containing a carburizing organic compound. The source gas supply source 71 will be described later with reference to FIG. 2. The carrier gas supply source 72 is, for example, a gas cylinder and supplies an inert gas such as nitrogen, argon or the like.

The flow controller 73 is connected to the source gas supply source 71 and carrier gas supply source 72, mixes the source gas supplied from the source gas supply source 71 and inert gas supplied from the carrier gas supply source 72 with each other to thereby prepare a carburizing gas containing a source gas of a predetermined concentration, and sends off the carburizing gas into the lead-in pipe 74 while controlling the flow rate and mixing ratio. It should be noted that when a predetermined carbon potential value is already obtained before dilution, only the source gas not diluted with the inert gas may be used as the carburizing gas. At a tip end of the lead-in pipe 74, the first mounting member 75 is provided. The first mounting member (first mouthpiece) 75 has an inner diameter slightly larger than an outer diameter of one end 101 of the steel tube 100, and is fitted on the one end 101. It should be noted that it is also possible to form the first mounting member 75 smaller than the one end 101, and fit the first mounting member 75 into the one end 101.

The gas exhaust device 8 is provided with an exhaust pipe 81 and second mounting member 82. At a tip end of the exhaust pipe 81, the second mounting member 82 is provided. A base end of the exhaust pipe 81 is connected to an external exhaust system 83. The second mounting member (second mouthpiece) 82 has a shape approximately identical to the first mounting member 75, and is fitted on another end 102 of the steel tube 100.

In the example shown in FIG. 1, the carburization device 3 is further provided with a sensor 84, emergency exhaust valve 85, and vacuum pump 86. The sensor 84 is, for example, an infrared gas concentration measurement instrument, and measures the CO concentration and $CO_2$ concentration to calculate a carbon potential value of a carburizing gas flowing through the steel tube 100. It should be noted that the sensor 84 may be a zirconia oxygen sensor configured to measure the oxygen concentration to calculate a carbon potential value or may be other sensors.

Upon detection of an abnormality, the emergency exhaust valve 85 lets the carburizing gas safely escape from the lead-in pipe 74 and exhaust pipe 81. The vacuum pump 86 de-aerates the steel tube 100, lead-in pipe 74, and exhaust pipe 81 at the time of, for example, a test operation or maintenance of the carburization device 3. It should be noted that the sensor 84, emergency exhaust valve 85, and vacuum pump 86 are not indispensable configurations, and can be omitted.

Figure 2:
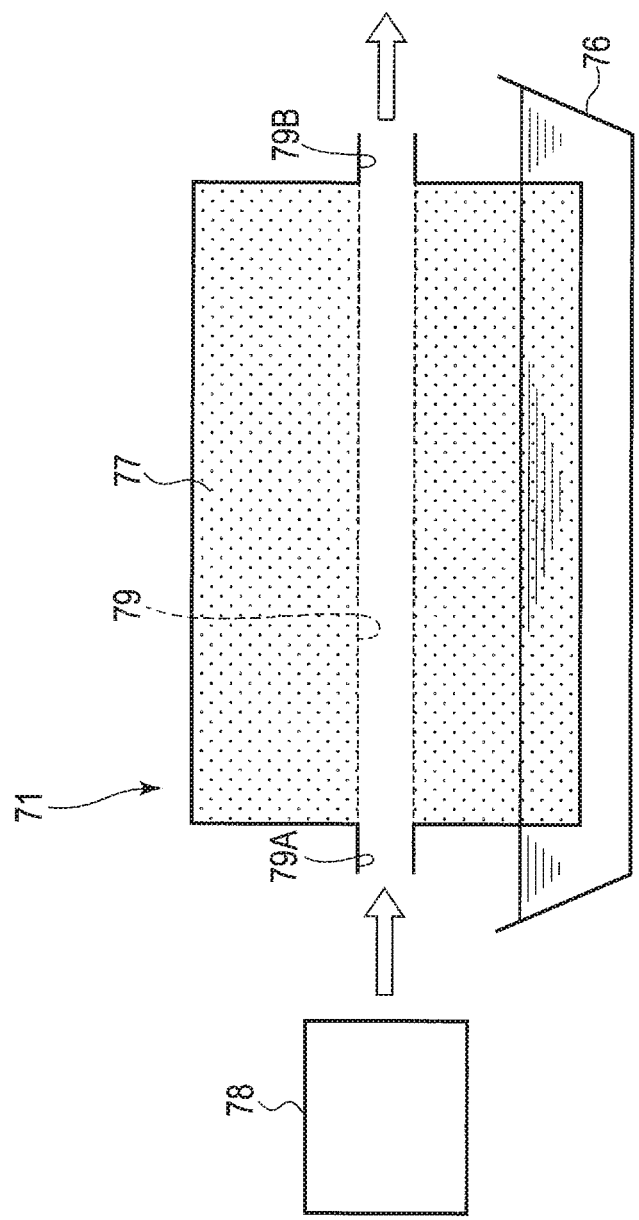
FIG. 2 is a cross-sectional view showing an example of a source gas supply source shown in FIG. 1.

FIG. 2 is a cross-sectional view showing an example of a source gas supply source 71 configured to generate a source gas. The source gas supply source 71 is, for example, an alcoholic vapor generator configured to generate an alcoholic vapor. It should be noted that the source gas supply source 71 is not limited to the example shown in FIG. 2. Other examples of the source gas supply source include a modification furnace (converter) configured to generate an endothermic converted gas (RX gas) from a hydrocarbon gas and air, cylinder configured to supply a high-concentration CO gas, and the like. Further, the source gas is not limited to the carburizing organic compound in the vapor state. The carburizing organic compound may be in the liquid state or solid state if the carburizing organic compound can continuously be supplied from the source gas supply source 71 to the inside of the steel tube 100. Further, the carburizing organic compound contained in the source gas is not limited to one type, and a plurality of carburizing organic compounds may be combined.

The source gas supply source (alcoholic vapor generator) 71 is provided with a tray 76 containing therein a liquid organic compound, porous block 77, and high-temperature gas supply source 78. An example of a liquid organic compound contained in the tray 76 is alcohol such as methanol, ethanol or the like. It should be noted that the organic compound in the tray 76 is not limited to alcohol if the organic compound is a liquid at normal temperature. For example, the organic compound may be ketone such as acetone or the like or may be carboxylic acid.

The porous block 77 is constituted of an open-cell cellular porous body, and a flow-through hole 79 penetrating the inside thereof is formed. An example of the porous body is a firebrick. At least part of the porous block 77 is immersed in the organic compound of the tray 76.

The high-temperature gas supply source 78 feeds a heated inert gas such as nitrogen, argon or the like from the flow-through hole 79 into the inside of the porous block 77. It should be noticed that the configuration may be contrived in such a manner that the aforementioned carrier gas supply source 72 also serves to fulfill the function of the high-temperature gas supply source 78. In that case, it is sufficient if the flow path of the carrier gas supply source 72 is bifurcated to provide a heater.

When a high-temperature inert gas flows into one end 79A of the flow-through hole 79 from the high-temperature gas supply source 78, the liquid organic compound which has permeated/diffused into the inside of the porous block 77 is evaporated, and the inert gas containing a vapor of the high-concentration organic compound flows out of another end 79B of the flow-through hole 79.

The inert gas containing the vapor of the organic compound evaporated by the source gas supply source 71 is supplied to the flow controller 73 as a source gas, and is diluted with an inert gas to thereby be prepared as a carburizing gas of a predetermined carbon potential value.

FIG. 3 is a cross-sectional view showing one end 101 of a steel tube 100 carburized by the carburizing method according to this embodiment. FIG. 4 is a perspective view showing one end 101 of a hollow stabilizer 100E of a completed product. With reference to FIG. 3 and FIG. 4, an unheated part 111 to be formed at each of the one end 101 and another end 102 will be described below. It should be noted that another end 102 has a configuration substantially identical to the one end 101. Accordingly, the one end 101 will be described in detail as a representative and, regarding another end 102, duplicated descriptions are omitted.

As shown in FIG. 3, to the one end 101 of the steel tube 100 being carburized, the first mounting member 75 is attached. To a position slightly inside the one end 101 along the steel tube 100, the first electrode 41 is attached. Although not shown, to another end 102, the second mounting member 82 is attached. To a position slightly inside another end 102, the second electrode 42 is attached.

When electric power is supplied from the electric power source 43 of the heating device 4, the part between the first electrode 41 and second electrode 42 is electrified, and the part of the whole length of the steel tube 100 between the first electrode 41 and second electrode 42 is heated. On the other hand, the part between the one end 101 and first electrode 41, and part between another end 102 and second electrode 42 are not electrified and heated. Let the part between the first electrode 41 and second electrode electrified and heated be a heated part 110. Let the part between the one end 101 and first electrode 41 not electrified and heated be an unheated part 111. Although the unheated part 111 is gradually heated by the heat conducted from the heated part 110 and the like, the temperature thereof never becomes higher than the heated part 110 electrified and heated.

In the steel tube 100 being carburized shown in FIG. 3, the carburizing gas is fed into the interior space 103 through the first mounting member 75, the air and carburizing gas are collected from the interior space 103 through the second mounting member 82, and the carburizing gas flows through the interior space 103. It should be noted that at this time, the steel tube outer surface 104 of the steel tube 100 is opened to the atmosphere. At the heated part 110, the steel tube inner surface 105 is heated.

When the carburizing gas flowing through the interior space 103 and steel tube inner surface 105 come into contact with each other, the organic compound contained in the carburizing gas is absorbed into the steel tube inner surface 105. On the steel tube inner surface 105 in the state where the inner surface 105 is heated at a high temperature, the absorbed organic compound is decomposed from the higher grade into the lower grade in sequence. For example, in the case of ethanol, $C_2H_5OH$ is decomposed into $CH_4+CO+H_2$ ($CH_4+CO+H_2 \Leftrightarrow CH_4+CO+H_2$). In the case of methanol, $CH_3OH$ is decomposed into $CO+2H_2$ ($CH_3OH \Leftrightarrow CO+2H_2$). The decomposed organic compound solid-solves carbon into the steel tube inner surface 105 by a reaction such as a Boudouard reaction $2CO \Leftrightarrow C+CO_2$, $CO+H_2 \Leftrightarrow C+H_2O$, $CH_4 \Leftrightarrow C+2H_2$ or the like. Thereby, in the heated part 110, a carburized layer is formed in at least a surface part of the steel tube inner surface 105.

The parts of the steel tube 100 including the one end 101 and another end 102 are subjected to plastic deformation by end processing to be described later, and are formed as fixing parts 111E configured to fix the hollow stabilizer 100E of a completed product to a vehicle. As shown in FIG. 4, the fixing part (eyeball part) 111E is formed at a part which has been the unheated part 111. Although not shown, likewise on another end 102 side, a fixing part is formed at a part which has been the unheated part.

In the state where the hollow stabilizer 100E is mounted on the vehicle, normally the heated part 110 is supported on the vehicle side through a rubber bushing or the like. The fixing part 111E is coupled to the axle side of the suspension device through a stabilizer link. In this embodiment, in order that the fatigue-resistant strength can be enhanced at the heated part 110 at which a heavy load is applied from the vehicle body, the carburized layer can be formed before quenching. In order to facilitate a working process at the fixing part 111E at which a heavy load is not applied, the fixing part 111E can be kept as the unheated part 111 at which a carburized layer is not formed before quenching.

Figure 5:
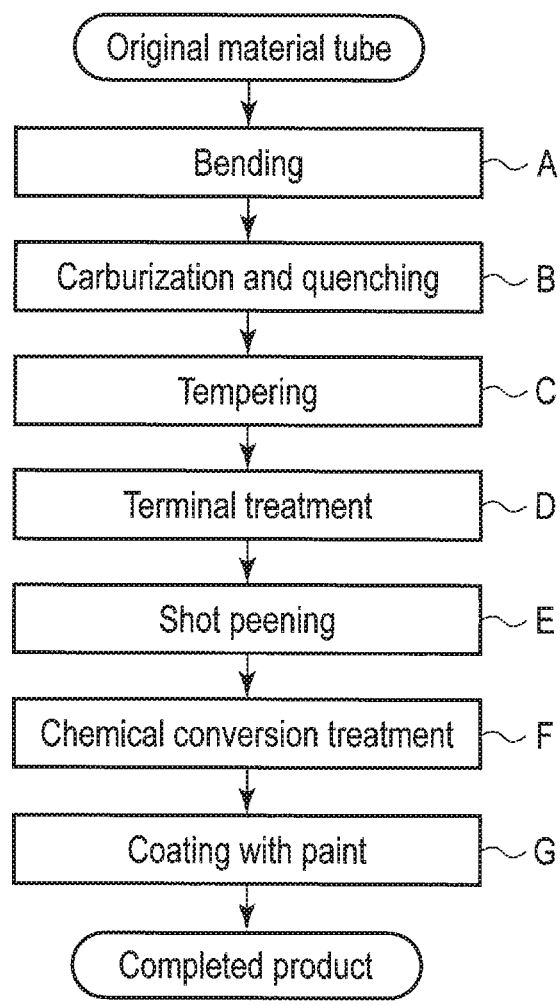
FIG. 5 is a view showing an example of a flow of a hollow stabilizer production method.

FIG. 5 is a view showing an example of a flow of a hollow stabilizer production process.

First, an original material tube formed of a spring steel or the like is subjected to bending/forming, whereby a steel tube 100 having a spring shape (torsion bar) an example of which is shown in FIG. 1 is formed (Step A: bending). Although the type of the spring steel is not particularly limited, a low-carbon Mn—B steel having a carbon concentration of about 0.15 to 0.40% by mass can be used. For example, SAE10B21 and SAE15B26 conforming to the stipulations of the Society of Automotive Engineers, Inc., can be mentioned. Other examples are 26MnB5 and 34MnB5. As another example of the spring steel, for example, SAE9254 conforming to the stipulations of the Society of Automotive Engineers, Inc., can be named. Furthermore, SUP7 conforming to JIS or else may also be used. The type of steel is not limited to the spring steel, and a high-strength steel and steel for carburization may also be employed. Bending is carried out by, for example, cold working. It should be noticed that forming may be carried out by hot working while heating the work-piece at a temperature higher than the recrystallization temperature.

The steel tube 100 formed into a spring shape is subjected to carburization and quenching (Step B: carburization and quenching). Carburization and quenching will be described later in detail with reference to FIG. 6.

The steel tube 100 is tempered to adjust the degree of hardness (Step C: tempering). A gear wheel, camshaft and the like are normally tempered at a temperature lower than 250° C., in this embodiment, however, in order to secure toughness required of a stabilizer, it is desirable that tempering be carried out at a temperature slightly higher than the temperature required by the condition for a gear wheel, camshaft and the like while avoiding the temperature range of low-temperature tempering brittleness. An example of the tempering temperature according to this embodiment is 150 to 350° C.

The one end 101 and another end 102 are subjected to plastic deformation to thereby be formed into the fixing part 111E shown in FIG. 4 (Step D: terminal treatment). As a specific example of plastic deformation, for example, the one end 101 and another end 102 are subjected to upsetting to thereby be formed into a solid part in the unheated part 111, and then the solid part is squeezed from the outer periphery in the radial direction to thereby be formed into a flat shape by press working. It should be noticed that the fixing part 111E may be formed by press working in one step or may be formed by some other plastic deformation.

The steel tube outer surface 104 is subjected to shot-peening treatment (Step E: shot peening). By the shot-peening treatment, the steel tube outer surface 104 can be hardened, and the surface stress of the steel tube outer surface 104 can be made uniform.

Further, it is possible to impart a residual compression stress to the steel tube outer surface 104, and enhance the durability and resistance to fatigue fracture.

A chemical conversion treatment layer is formed on the steel tube outer surface 104 (Step F: chemical conversion treatment). The chemical conversion treatment layer can be formed by, for example, a phosphoric salt such as a zinc phosphate or the like.

In order to improve the anti-corrosive performance and resistance to chipping, the steel tube outer surface 104 is coated with paint (Step G: coating with paint). The coated film can be formed by, for example, powder baking coating.

After the steps described above, the hollow stabilizer 100E formed by processing the original material tube is completed.

Figure 6:
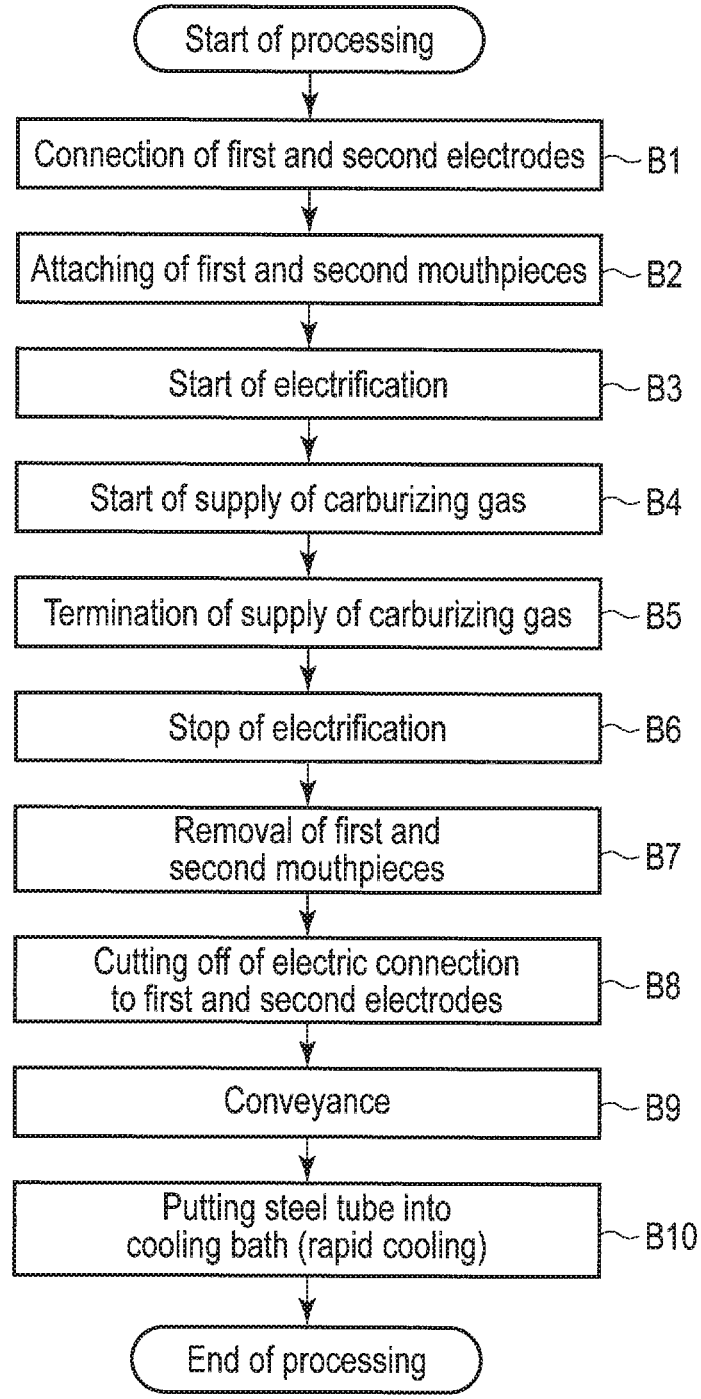
FIG. 6 is a view showing an example of a flow of carburization and quenching step shown in FIG. 5.

FIG. 6 is an example of a detailed procedure for carburization and quenching (Step B) shown in FIG. 5.

In the hollow stabilizer production method of the present invention, that carburization and quenching of the steel tube inner surface 105 are consecutively carried out is one of the characteristics thereof.

First, the first electrode 41 and second electrode 42 are clamped at positions of the steel tube 10 respectively close to the one end 101 and close to another end 102, whereby the first electrode 41 and second electrode 42 are each electrically connected the steel tube 100 (Procedure B1). The first mounting member 75 and second mounting member 82 are respectively attached to the one end 101 and another end 102 of the steel tube 100 (Procedure B2). It should be noted that Procedure B1 and Procedure B2 may be carried out in reverse order.

The part between the first electrode 41 and second electrode 42 is electrified to thereby heat the heated part 110 of the steel tube 100 (Procedure B3). It should be noted that Procedure B2 and Procedure B3 may be carried out in reverse order.

The carburizing gas is supplied to the first mounting member 75, and then the carburizing gas is made to flow through the interior space 103 of the steel tube 100 (Procedure B4). When the carburizing gas is adsorbed into the steel tube internal surface 105 in the heated state at the heated part 110, carbon of the carburizing gas is solid-solved into the steel tube 100 by the aforementioned Boudouard reaction, and a carburized layer is formed in the surface part of the steel tube inner surface 105. It should be noted that at the unheated part 111 which is not heated, the equilibrium state of the Boudouard reaction is too far to the left side, and hence no carburized layer is formed.

In order that a carbon concentration appropriate for quenching may be obtained after an elapse of the conveyance time (diffusion period) to be described later, a carburized layer containing therein carbon to an excessive degree is formed, and then the supply of the carburizing gas to the first mounting member 75 is terminated (Procedure B5). When the steel tube 100 is heated to a predetermined temperature, electrification between the first electrode 41 and second electrode 42 is topped, whereby heating of the steel tube 100 is stopped (Procedure B6).

The first mounting member 75 and second mounting member are removed (Procedure B7). The first electrode 41 and second electrode 42 are unclamped, whereby the electric connection to the steel tube 100 is cut off (Procedure B8). The conveying device (transfer robot) 6 is used to convey the steel tube 100 heated to a high temperature from the heating device 4 to the cooling bath 5 (Procedure B9). At this time, the carbon which has been solid-solved in the part in the vicinity of the steel tube inner surface 105 in an excessive concentration diffuses in the wall-thickness direction of the steel tube 100.

The steel tube 100 is put into the cooling bath 5, whereby the steel tube 100 is rapidly cooled with such a temperature gradient as to create a hardened structure (martensite) (Procedure B10). Thereby, a hardened structure is formed in the surface part of the steel tube inner surface 105 of the steel tube 100.

That is, in this embodiment, the steel tube in the state where the steel tube is heated to a high temperature by the carburization is rapidly cooled, whereby quenching of the steel tube is carried out subsequently to the carburization without a break.

Figure 7:
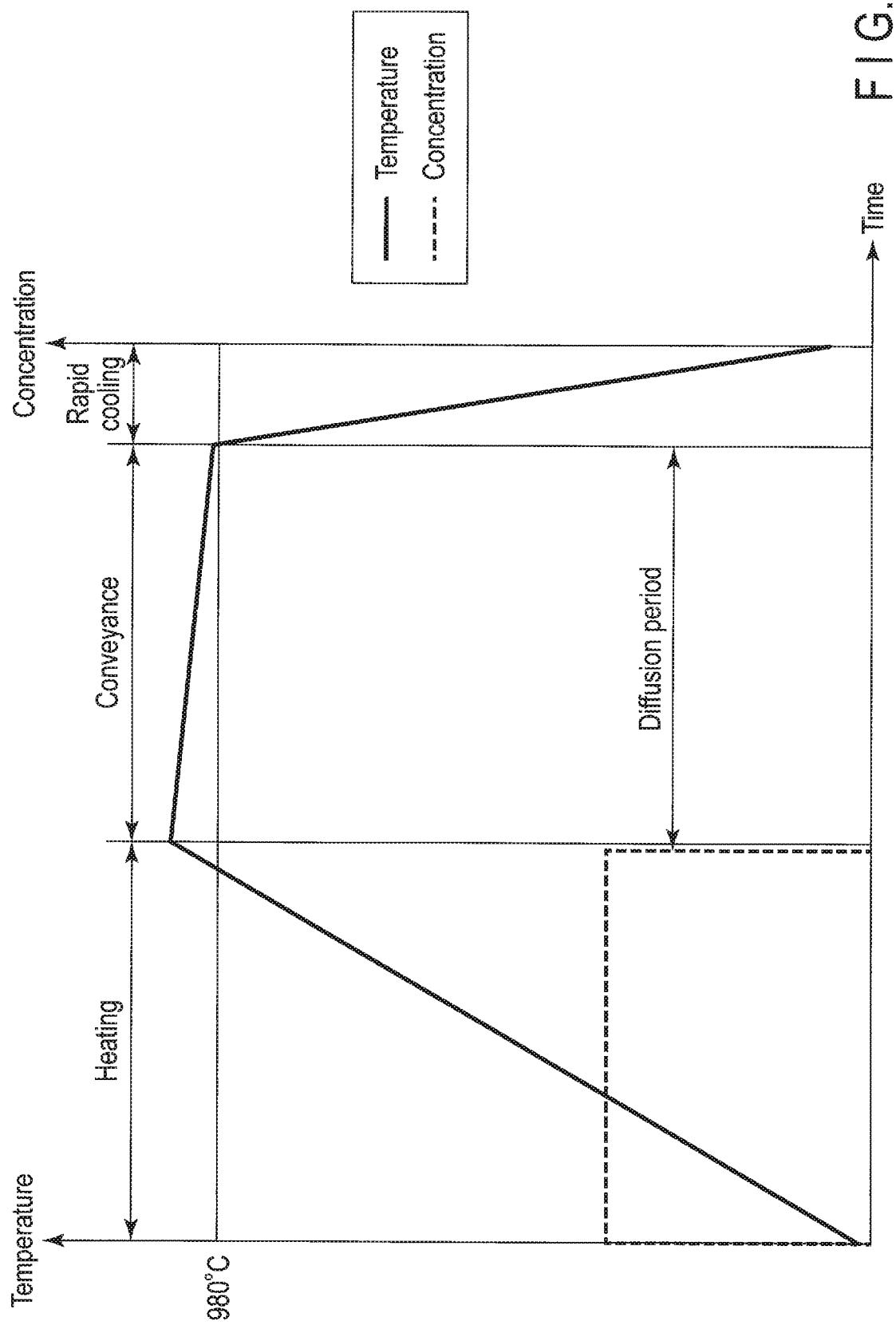
FIG. 7 is a view showing an example of relationships between the temperature of a hollow stabilizer, carbon potential value of a carburizing gas and elapsed time in the carburization and quenching step shown in FIG. 6.

FIG. 7 is a view showing an example of relationships between the temperature of the steel tube inner surface 105 of the steel tube 100, carbon potential value of a carburizing gas and elapsed time in the carburization and quenching step (Step B) shown in FIG. 5. The time elapsed from the stop of supply of the carburizing gas (Procedure B5) to the rapid cooling (Procedure B10) is, for example, 60 seconds. The steel tube 100 at the time immediately after the stop of supply of the carburizing gas is carburized in an excessive carbon concentration in the vicinity of the steel tube inner surface 105 in the wall-thickness direction. The carbon in the excessive concentration diffuses into the material from the steel tube inner surface 105 in the wall-thickness direction while the steel tube 100 is conveyed and, at timing of, for example, lowering of the carbon concentration of the surface part of the steel tube inner surface 105 to about 0.6% by mass, the steel tube 100 is rapidly cooled. The quenching temperature is, for example, 980 to 1000° C. (austenitizing temperature). During the time from Procedure B5 to Procedure B10, the temperature of the steel tube 100 gradually lowers.

In the hollow stabilizer production method of this embodiment including the procedures described above, the carburizing gas is made to flow in the midst of the heating (from Procedure B3 to Procedure B6) to be carried out for the purpose of quenching (Procedure B4). Carburization and quenching can consecutively be carried out, and hence energy to be consumed can be saved as compared with a case where heating to be carried out for carburization and heating to be carried out for quenching are separately carried out.

In this embodiment, electrification heating is carried out to thereby carburize the steel tube inner surface 105 in the state where the steel tube outer surface 104 is opened to the atmospheric ambience.

That is, the steel tube inner surface 105 can be carburized without putting the steel tube into a dedicated carburizing furnace. There is no need for a dedicated carburizing furnace or modification furnace (converter), and hence the cost of equipment and administration cost can be saved. The amount of the carburizing gas to be used can also be saved.

In the case where the steel tube is put into a carburizing furnace, the production is carried out in a batch-wise manner, and hence the time required to complete the hollow stabilizer 100E is made longer. In this embodiment, it is possible to add the carburization step to the quenching step without prolonging the time required for production of the hollow stabilizer 100E.

In this embodiment, the carbon decarburized from the steel tube inner surface 105 is restored by the carburization and, thereafter quenching is carried out. The effect of quenching is enhanced, and hence sufficient fatigue-resistant strength can be secured for the steel tube inner surface 105 without carrying out shot peening or the like.

It should be noticed that although an increase in cost is required, it is possible to subject the steel tube inner surface 105 to shot peening. It is not possible to create a residual compression stress exceeding a yield stress of the material to be treated by shot peening, according to this embodiment, however, it is possible to restore the yield stress of the steel tube inner surface 105 which has been lowered by the decarburization. Accordingly, when shot peening is carried out, the effect thereof can be enhanced.

If the carburized and hardened part is subjected to plastic deformation, there is a fear of occurrence of cracks. In this embodiment, an unheated part 111 at which the steel tube inner surface 105 is not carburized is remained at each of the part close to the one end 101, and part close to another end 102 in the overall length of the steel tube 100 and, the unheated part 111 is subjected to plastic deformation to thereby be formed into a fixing part (eyeball part) 111E configured to attach the hollow stabilizer 100E to the vehicle. It is possible to enhance the fatigue-resistant strength at the heated part 110 in the overall length of the hollow stabilizer 100E, and prevent a crack from occurring at each fixing part 111E.

In this embodiment, an alcoholic vapor is used as a raw material for the carburizing gas. Alcohol such as ethanol or the like to be used as the raw material is available at a low price, and hence the production cost can be reduced. The raw material for the carburizing gas is a liquid at normal temperature, and hence has a less danger of explosion caused by gas leakage or the like as compared with a case where an RX gas or the like is used, and the safety of the plant can be improved.

The hollow stabilizer production device 1 can preferably be used in the hollow stabilizer production method of this embodiment. Accordingly, it is possible to exhibit various effects achieved by the hollow stabilizer production method of this embodiment described so far.

The hollow stabilizer production device 1 is provided with a source gas supply source 71 which is an alcoholic vapor generator. The source gas supply source 71 is simple and compact in configuration as compared with a modification furnace (converter) generally used for RX gas conversion. The configuration of the source gas supply source 71 is simple, and hence the cost of the equipment can be saved. The source gas supply source 71 is compact, and hence the carburization device 3 can be arranged in the close vicinity of the quenching device 2 in layout. When the distance between the carburization device 3 and quenching device 2 is made short, it becomes possible to consecutively carry out carburization and quenching, and save energy to be consumed. The conveyance time is adjusted to enable optimization of the diffusion period. Moreover, the installation space of the carburization device 3 can be saved.

Second Embodiment

Figure 8:
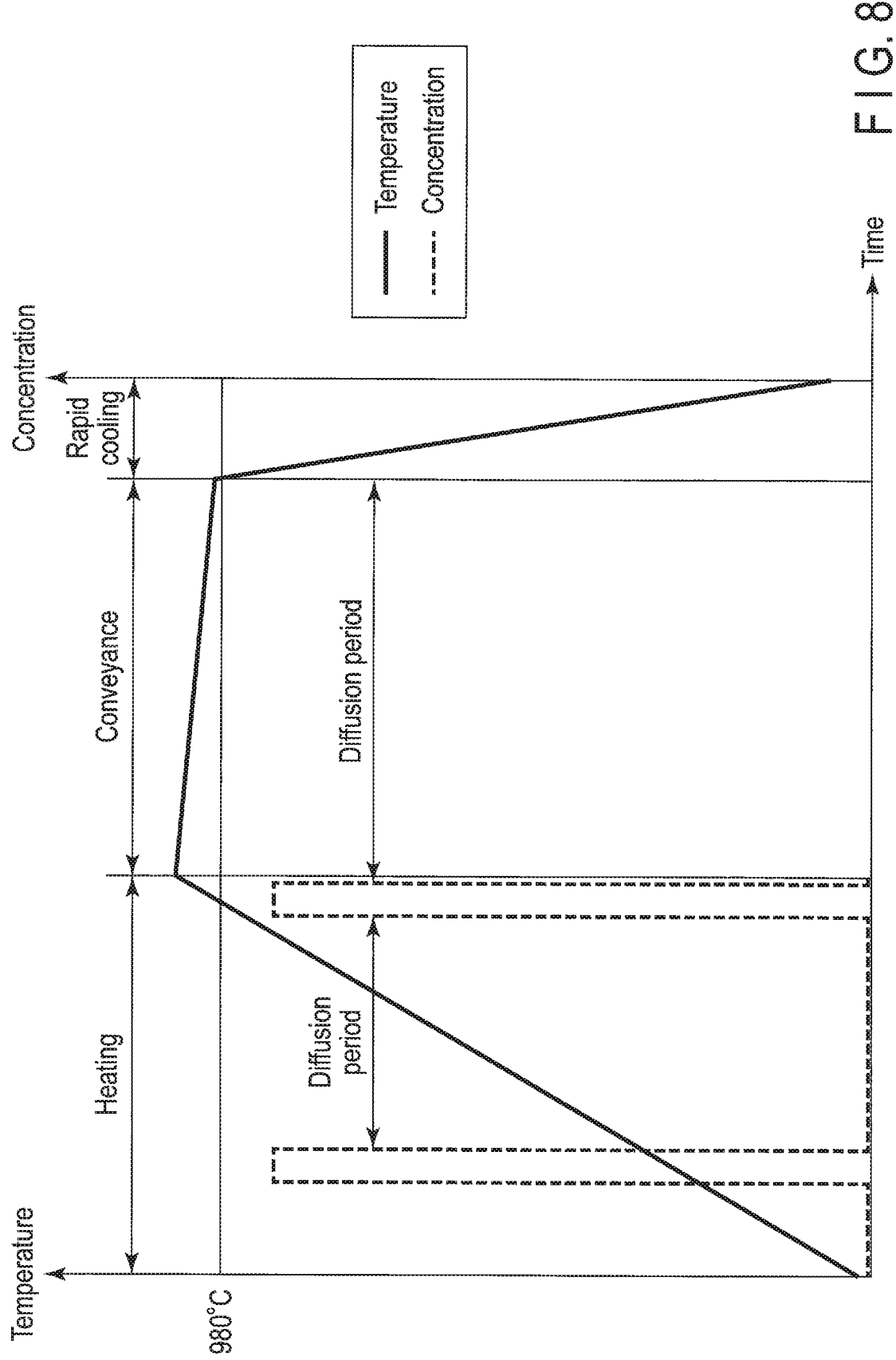
FIG. 8 is a view showing an example of relationships between the temperature of a hollow stabilizer, carbon potential value of a carburizing gas and elapsed time in the carburization and quenching step according to a second embodiment.

FIG. 8 is a modification example of the carburation and quenching step shown in FIG. 7. In the modification example shown in FIG. 8, a mixing ratio between the source gas (alcoholic vapor, RX gas or the like) for supplying carbon and inert gas is changed by time division. For example, a carburizing gas a source gas of which has a high concentration, and carburizing gas a source gas of which has an extremely low concentration, and which is substantially constituted of only an inert gas are switched by the flow controller 73, and are alternately supplied at regular intervals.

During the time (carburization period) for which a carburizing gas having a high concentration of the source gas is supplied, the carbon potential value in the atmosphere of the interior space 103 of the steel tube 100 becomes high. During the interval (diffusion period) for which a carburizing gas having a low concentration of the source gas is supplied, the carbon potential value in the atmosphere of the interior space 103 of the steel tube 100 becomes low. By placing an interval of a fixed time, the carbon is made to diffuse in the wall-thickness direction of the steel tube 100, and soot is prevented from adhering to the steel tube inner surface 105. It is desirable that the interval be held longer than the carburization period and, for example, the carburization period is held for 7 seconds, and interval is held for 53 seconds. The length of time for the interval is, for example, seven to ten times the carburization period.

In the example shown in FIG. 8, a carburizing gas having a high concentration of the source gas is made to flow two times during the heating of the steel tube 100, and carburizing gas having a low concentration of the source gas is made to flow one time during the same period. More specifically, the carburizing gas having a high concentration of the source gas is made to flow during the heating of the steel tube 100 (first carburization period), then carburizing gas having a low concentration of the source gas is made to flow (first interval), still then carburizing gas having a high concentration of the source gas is made to flow again (second carburization period), and thereafter the heated steel tube 100 is conveyed to the cooling bath 5 to be quenched. During the conveyance time, carbon carburized during the second carburization period diffuses in the wall-thickness direction. That is, the configuration is contrived in such a manner that the conveyance time serves also as the second interval, and the carburization cycle is repeated two times.

In the second embodiment, a carburization cycle constituted of the aforementioned carburization period and interval is repeated one to several times during the heating. The carburization and diffusion are repeated several times, whereby it is possible to freely control the carbon concentration to a depth from the surface part of the steel tube inner surface 105 to about 1 mm, and thereby form a carburized layer. The carbon concentration of the carburized layer formed by the second embodiment is, for example, 0.4 to 1.2% by mass.

In the case of a gear wheel, camshaft or the like where priority is given to the degree of hardness over the toughness, carburization of a high concentration in which the carbon concentration of the carburized layer is, for example, about 1.0% by mass is required, in the case of a stabilizer, however, carburization in which the carbon concentration of the carburized layer is, for example, 0.6% by mass or lower is desirable in order to secure the toughness necessary for a spring. According to this embodiment, by only adjusting the number of carburization cycles, it is possible to finish the stabilizer to a preferred carbon concentration.

Third Embodiment

A third embodiment shown in FIG. 9 is a still another modification example of the carburization and quenching step shown in FIG. 8. In the third embodiment, after the steel tube 100 is heated and the temperature thereof is raised to a predetermined temperature (temperature making it possible to retain the austenitizing temperature even after conveyance), the steel tube is not conveyed immediately and is held for a fixed period of time in a state where the raised temperature is retained, and a carburization cycle is repeated even while the raised temperature is retained.

In the example shown in FIG. 9, a carburizing gas having a high concentration of the source gas is made to flow four times while the steel tube 100 is heated, and carburizing gas having a low concentration of the source gas is made to flow three times. More specifically, while the steel tube is being heated to or is heated at the predetermined temperature, processing in the first carburization period and interval, and second carburization period and interval is carried out. While the predetermined temperature is retained, processing in the third carburization period and interval, and fourth carburization period is further carried out, and thereafter the heated steel tube 100 is conveyed to the cooling bath 5 to be quenched. During the conveyance time, carbon carburized during the fourth carburization period diffuses in the wall-thickness direction. That is, the configuration is contrived in such a manner that the conveyance time serves also as the fourth interval, and the carburization cycle is repeated four times.

In the third embodiment, the raised temperature retention time is provided in addition to the temperature raise time, it is possible to repetitively carry out the carburization cycle for a longer time than the second embodiment correspondingly. It is possible to form a carburized layer having a higher carbon concentration than the second embodiment, and adjust the spring to a higher degree of hardness. It is also possible to increase the number of times of the carburization cycles, and apply the method to a type of steel hard to carburize.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of producing a hollow stabilizer for a vehicle, the method comprising:
    attaching a first mounting member and a second mounting member respectively to a first end and a second end of a hollow steel tube, the hollow steel tube having an interior space, and the first end and the second end being open ends of the hollow steel tube;
    connecting a first electrode to the hollow steel tube at a first position such that the first position is spaced apart from the first end of the hollow steel tube;
    connecting a second electrode to the hollow steel tube at a second position such that the second position is spaced apart from the second end of the hollow steel tube;
    heating the hollow steel tube by electrifying a portion the hollow steel tube that is between the first electrode and the second electrode;
    feeding a carburizing gas into the interior space of the hollow steel tube through the first mounting member, and collecting exhaust gas from the interior space through the second mounting member to thereby carburize an inner surface of the hollow steel tube, during the heating of the hollow steel tube; and
    rapidly cooling the hollow steel tube to thereby quench the hollow steel tube.

2. The method of claim 1, wherein the carburizing gas contains an alcoholic vapor.

3. The method of claim 1, wherein the heating and the quenching of the hollow steel tube are carried out in a state in which an outer surface of the hollow steel tube is exposed to surrounding atmosphere.

4. The method of claim 3, wherein during the heating, a first part of the hollow steel tube between the first position and the first end and a second part of the hollow steel tube between the second position and the second end are not electrified, and
    wherein the method further comprises subjecting the first part and the second part to plastic deformation to form the first part and the second part into fixing parts configured to attach the hollow stabilizer to the vehicle.

5. The method of claim 1, further comprising, after the inner surface of the hollow steel tube is carburized and before the hollow steel tube is rapidly cooled, providing a diffusion period during which carburized carbon diffuses.

* * * * *